United States Patent
Peh et al.

(10) Patent No.: US 8,027,969 B2
(45) Date of Patent: Sep. 27, 2011

(54) EFFICIENT CALCULATION OF SETS OF DISTINCT RESULTS IN AN INFORMATION RETRIEVAL SERVICE

(75) Inventors: Thomas Peh, Heidelberg (DE); Holger Schwedes, Stutensee (DE); Oliver M. Steinau, Mannheim (DE); Wolfgang Stephan, Heidelberg (DE)

(73) Assignee: SAP AG, Walldorf (DE)

( * ) Notice: Subject to any disclaimer, the term of this patent is extended or adjusted under 35 U.S.C. 154(b) by 562 days.

(21) Appl. No.: 11/435,149

(22) Filed: May 15, 2006

(65) Prior Publication Data
US 2007/0185838 A1 Aug. 9, 2007

Related U.S. Application Data

(63) Continuation of application No. 11/323,392, filed on Dec. 29, 2005, now abandoned.

(51) Int. Cl.
G06F 7/00 (2006.01)
(52) U.S. Cl. ............ 707/713; 707/802; 707/E17.061; 707/E17.129; 707/999.001
(58) Field of Classification Search .......... 707/1–5, 707/713, E17.061, E17.129, 999.001, 802
See application file for complete search history.

(56) References Cited

U.S. PATENT DOCUMENTS

| | | | | |
|---|---|---|---|---|
| 5,357,431 A * | 10/1994 | Nakada et al. | ........... | 715/201 |
| 5,511,190 A * | 4/1996 | Sharma et al. | ........... | 1/1 |
| 5,548,754 A * | 8/1996 | Pirahesh et al. | ........... | 1/1 |
| 5,615,361 A * | 3/1997 | Leung et al. | ........... | 707/3 |
| 5,761,653 A * | 6/1998 | Schiefer et al. | ........... | 707/713 |
| 5,787,415 A * | 7/1998 | Jacobson et al. | ........... | 1/1 |
| 5,822,748 A * | 10/1998 | Cohen et al. | ........... | 1/1 |
| 5,870,747 A * | 2/1999 | Sundaresan | ........... | 1/1 |
| 5,884,304 A * | 3/1999 | Davis et al. | ........... | 1/1 |
| 6,014,647 A | 1/2000 | Nizzari et al. | | |
| 6,105,025 A * | 8/2000 | Jacobs et al. | ........... | 1/1 |
| 6,112,209 A * | 8/2000 | Gusack | ........... | 1/1 |
| 6,202,070 B1 * | 3/2001 | Nguyen et al. | ........... | 1/1 |
| 6,279,007 B1 * | 8/2001 | Uppala | ........... | 1/1 |
| 6,366,902 B1 * | 4/2002 | Lyle et al. | ........... | 707/2 |

(Continued)

FOREIGN PATENT DOCUMENTS

EP 1164509 12/2001

(Continued)

OTHER PUBLICATIONS

Matos et al., SQL-based Discovery of Exact and Approximate Functional Dependencies, Jun. 2004, ACM, pp. 58-63.*

(Continued)

*Primary Examiner* — Wilson Lee
*Assistant Examiner* — Jessica N Le
(74) *Attorney, Agent, or Firm* — Mintz, Levin, Cohn, Ferris, Glovsky and Popeo, P.C.

(57) ABSTRACT

Systems and methods are provided for efficient calculation of sets of distinct results in an information retrieval service. A query is received having at least one requested attribute and one or more conditions. For each row identifier in a database table that matches the one or more conditions, a tuple of value identifiers having an entry for each requested attribute is calculated. A unique number is generated and assigned to the tuple for each distinct combination of the value identifiers. Duplicate entries in the tuple listing are identified and removed, so that a result set provides only distinct results.

11 Claims, 3 Drawing Sheets

U.S. PATENT DOCUMENTS

| | | | |
|---|---|---|---|
| 6,370,524 B1* | 4/2002 | Witkowski | 707/3 |
| 6,393,415 B1* | 5/2002 | Getchius et al. | 1/1 |
| 6,427,145 B1* | 7/2002 | Hara et al. | 1/1 |
| 6,438,562 B1* | 8/2002 | Gupta et al. | 707/696 |
| 6,449,606 B1* | 9/2002 | Witkowski | 707/3 |
| 6,453,314 B1* | 9/2002 | Chan et al. | 707/3 |
| 6,460,027 B1* | 10/2002 | Cochrane et al. | 707/2 |
| 6,721,751 B1* | 4/2004 | Furusho | 707/752 |
| 6,826,563 B1* | 11/2004 | Chong et al. | 707/745 |
| 6,850,927 B1* | 2/2005 | Hsu | 707/2 |
| 6,882,993 B1* | 4/2005 | Lawande et al. | 707/714 |
| 6,988,139 B1* | 1/2006 | Jervis et al. | 709/226 |
| 7,020,661 B1* | 3/2006 | Cruanes et al. | 1/1 |
| 7,062,493 B1* | 6/2006 | Babka et al. | 707/756 |
| 7,349,897 B2* | 3/2008 | Cunningham et al. | 707/3 |
| 7,539,666 B2* | 5/2009 | Ashworth et al. | 1/1 |
| 7,587,383 B2* | 9/2009 | Koo et al. | 1/1 |
| 7,814,091 B2* | 10/2010 | Ghosh et al. | 707/713 |
| 7,917,482 B1* | 3/2011 | Gutti et al. | 707/702 |
| 2003/0212694 A1* | 11/2003 | Potapov et al. | 707/100 |
| 2004/0003005 A1* | 1/2004 | Chaudhuri et al. | 707/200 |
| 2004/0034616 A1* | 2/2004 | Witkowski et al. | 707/1 |
| 2004/0034636 A1* | 2/2004 | Vallur et al. | 707/8 |
| 2004/0083213 A1 | 4/2004 | Wu et al. | |
| 2005/0044102 A1* | 2/2005 | Gupta et al. | 707/102 |
| 2005/0165838 A1* | 7/2005 | Fontoura et al. | 707/104.1 |
| 2006/0112090 A1* | 5/2006 | Amer-Yahia et al. | 707/4 |
| 2006/0116989 A1* | 6/2006 | Bellamkonda et al. | 707/3 |
| 2006/0161515 A1* | 7/2006 | Barsness et al. | 707/2 |
| 2006/0206477 A1* | 9/2006 | Dalvi et al. | 707/5 |
| 2006/0221977 A1* | 10/2006 | Basso et al. | 370/395.32 |
| 2007/0073643 A1* | 3/2007 | Ghosh et al. | 707/2 |

FOREIGN PATENT DOCUMENTS

EP    1398718    3/2004

OTHER PUBLICATIONS

Ganguly et al., Join-Distinct Aggregate Estimation over Update Streams, Jun. 2005, ACM, pp. 259-270.*

Bilke et al., Schema Matching using Duplicates, IEEE, Apr. 2005, pp. 69-80.*

Slivinskas et al., Query Plans for Conventional and Temporal Queries Involving Duplicates and Ordering, IEEE, 2000, pp. 547-558.*

"SAP NetWeaver 2004s Standalone Engine Search and Classification (TREX) Single Host", [online]. Retrieved from the Internet: URL:http://help.sap.com/bp_epv170EP_US/Documentation// How-to/Installation/Install_Search_Classfication_ TREXSingleHost.pdf [retrieved on Dec. 12, 2007].

* cited by examiner

EFFICIENT CALCULATION OF SETS OF DISTINCT RESULTS IN AN INFORMATION RETRIEVAL SERVICE

CROSS REFERENCE TO RELATED APPLICATIONS

This application is a continuation in part (and claims the benefit of priority under 35 USC 120) of U.S. application Ser. No. 11/323,392, filed Dec. 29, 2005 now abandoned. The disclosure of the prior application is considered part of (and is incorporated by reference in) the disclosure of this application.

BACKGROUND

In today's commercial enterprises, knowledge management (KM) includes the collection and unification of information that exists in the enterprise, and making that information usefully accessible to users. For example, a major KM activity is searching in unstructured data such as text documents. Unstructured information is contained in unstructured or semi-structured documents, in formats like Microsoft Office for collaborative desktop applications, or a markup language such as HTML or XML used for web-based applications. These documents are stored as files, where the associated metadata is an example of structured data but in this case provides only secondary information.

Another major KM activity is extracting requested sets of records containing structured information from databases. Searches on structured data are usually performed either directly or indirectly on data in the fields of relational database tables. Search requests or queries from the users of a KM system who wish to access structured information may be formulated for the purposes of information retrieval in a syntax similar to Standard Query Language (SQL).

A conventional information retrieval service of the sort used in such a KM system breaks down query processing into several steps. These steps typically include planning and optimization, calculation, and projection. Consider an exemplary query formulated by a user of a KM system who wishes to retrieve certain information from the sales records that have been stored in the system by or on behalf of a book store, where these records are stored as structured information. In a relational data model illustrated in FIG. 1, this data can be stored in three relations: BOOKS, SALES, and CUSTOMERS. The information retrieval service may be configured to answer a question such as "Which customers purchased at least one book in 2004, and by which author(s)?" when this question is suitably formulated in an SQL-like syntax.

For any customer who purchased more than one book from the same author in 2004, there is more than one sales record in the data. For any customer who bought any book in 2004, the result set is expected to include one row per author. For any customer who bought several books from the same author, only one row in the result set is expected. In the calculation step, tuples of RowIDs of the result set that match the SELECT and JOIN condition(s) are listed. In the projection step, the listed RowIDs are materialized by translation into values of the requested attributes for return as results.

The step of making the final results distinct with respect to some requested attributes can occur after the projection step, but this is inefficient because there may be a large number of intermediate results to be materialized, most of which are then removed when a DISTINCT condition is applied. In the example, there may be many customers who bought more than one book from the same author in 2004, and the lines for all the second and further books need to be removed. Conventional information retrieval services typically generate duplicate rows for any given customer and author when processing the result set.

SUMMARY

This document describes information retrieval service systems and methods that are able to answer queries that request a list of distinct results with respect to a set of given attributes. These methods and systems avoid projection of intermediate result lines that are later discarded, and increase concurrency by enabling unique number mappings to be calculated for each table separately, and thus for many tables in parallel. Row identifier and unique number lists can be calculated once, and cached or persisted between several queries if the scenario involves subsequent processing of similar queries with the same set of requested attributes.

In one aspect, a query is received having at least one requested attribute and one or more conditions. For each row identifier in a database table that matches the one or more conditions, a tuple of value identifiers having an entry for each requested attribute is calculated. A unique number is generated and assigned to the tuple for each distinct combination of the value identifiers. Duplicate entries in the tuple listing are identified and the corresponding rows removed, so that a result set provides only distinct results.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
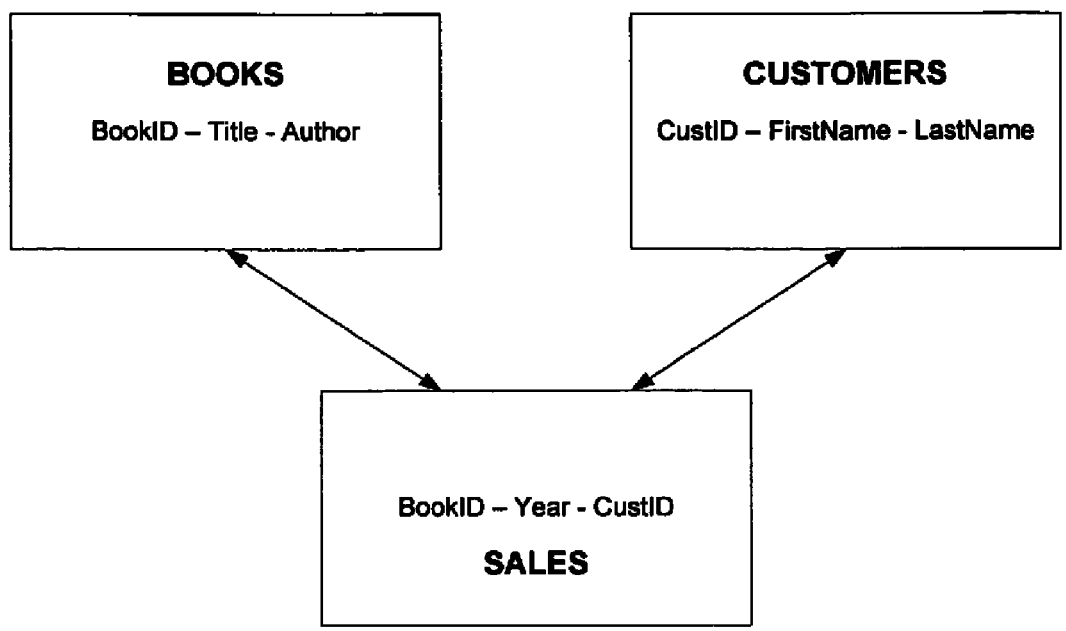
FIG. 1 illustrates the relational database model for an exemplary application scenario for a KM system.
Figure 2:
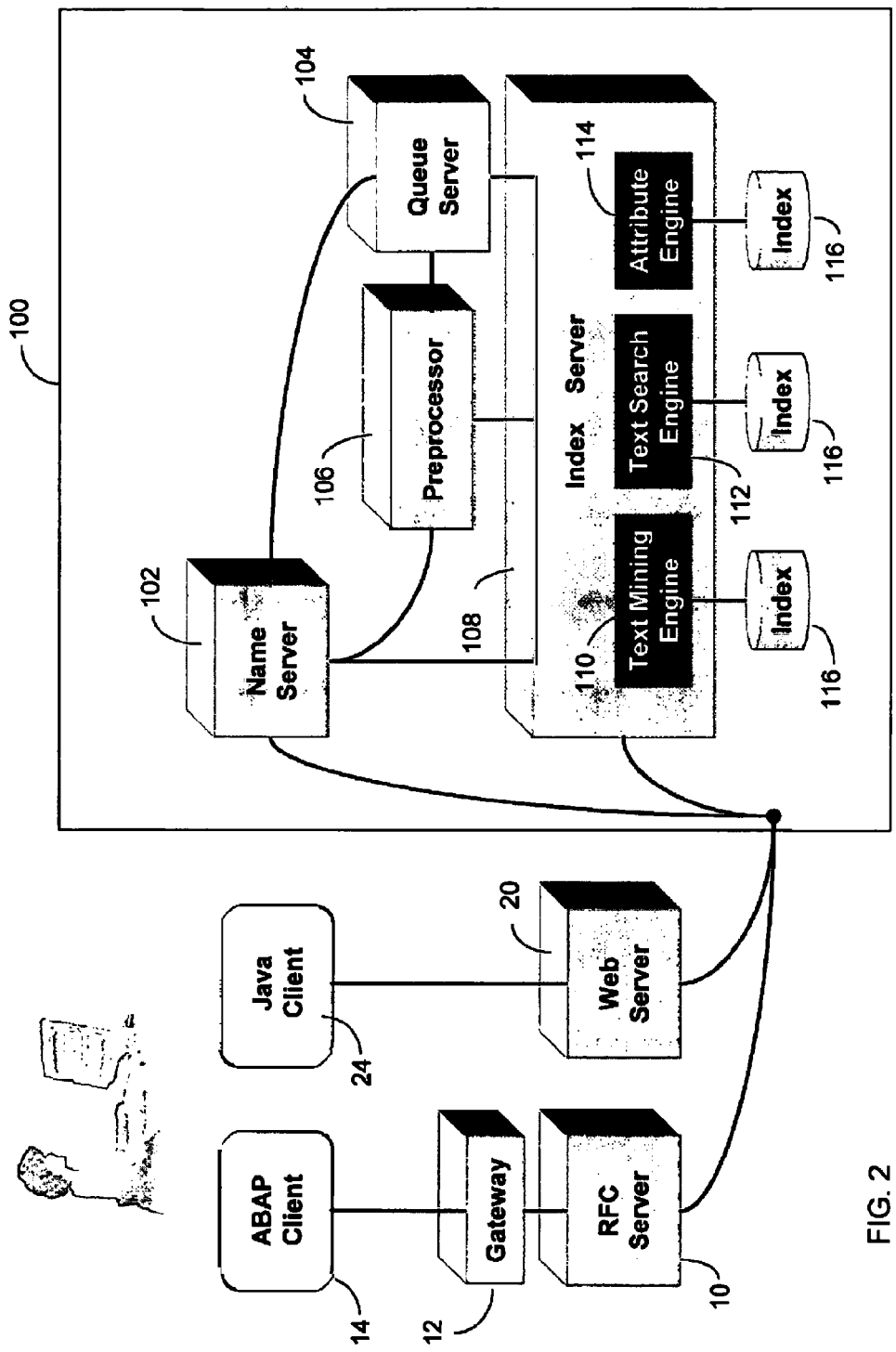
FIG. 2 shows a retrieval service system upon which embodiments of the efficient calculation of sets of distinct results can be executed.

This document describes information retrieval services that are configured to answer queries that request a list of distinct results with respect to a set of given attributes. FIG. 2 shows a schematic representation of an exemplary embodiment of an information retrieval service system 100 upon which calculation of sets of distinct results can be executed. The exemplary embodiment of the information retrieval service system 100 is an SAP NetWeaver search and classification engine TREX (Text Retrieval and Extraction), developed by SAP AG of Walldorf, Germany. With the information retrieval system 100, users can search in various ways, and in particular can search in a way which is relevant to this disclosure, which is to say they can enter text which is logically equivalent to a query specified in an SQL-like syntax that requests the retrieval of certain information from a store of structured information, where the store may conform to a data model like that shown for an exemplary application scenario in FIG. 1.

The exemplary information retrieval service system 100 receives queries in one of several ways. It may receive queries from a web server 20, which in turn receives hypertext transport protocol (HTTP) requests from a client 24, such as a JAVA client program. Alternatively, queries can also be received from a Remote Function Call (RFC) server 10 via a gateway 12 from a business application client 14 implemented in the SAP Advanced Business Application Programming (ABAP) language.

Within TREX, a name server 102 directs the incoming queries to the appropriate engine in an index server 108. The index server 108 includes several engines configured for particular types of searches, such as a text mining engine 100, a text search engine 112, and their associated indices 116. In the case of relevance for this disclosure, requests for searches on structured data are sent to an attribute engine 114, which initiates searches over the tables representing the relevant relations.

Results of the search requests are returned to the user via the web client or business application client.

Consider the example given above of sales records from a book store, and the question: "Which customers purchased at least one book in 2004, and by which author(s)?" This query may be input by the user in a suitably natural form and converted by the information retrieval system into a form suitable for processing. For example, it may be converted into a form expressed in an SQL-like syntax as:

SELECT DISTINCT Customers.FirstName, Customers.LastName, Books.Author
FROM Customers, Books WHERE Sales.Year=2004 AND
Books.BookID=Sales.BookID AND Customers.CustID=Sales.CustID The DISTINCT condition in the query commands the information retrieval service to process the result set so as to eliminate duplicate rows for any given customer and author. The service described in this disclosure is an improved way to execute this command.

In the calculation step, tuples of RowIDs of the result set that match the SELECT and JOIN condition(s) are listed. As described above, in a conventional response to such a query, during the projection step, the listed RowIDs are materialized by translation into values of the requested attributes for return as results. However, in accordance with an information retrieval system disclosed herein, the RowID tuples in the result set are removed before the projection step, so that the result after the projection does not contain duplicate rows.

To execute removal of the RowID tuples, before the projection step, for each table comprising one or more requested attributes and each RowID in that table, a unique number (UN) is calculated. Rows that have the same value combinations with regard to the requested attributes of this table receive the same UN. This calculation can be done for each table separately before the final projection step. This process enables implementations to achieve a high level of concurrency, and hence to make efficient use of the parallelization capabilities of modern computing hardware. Following the UN calculation, the projection step requires no additional processing for the identification of distinct rows, and can break off after creating k distinct rows, in case only k distinct results are required, and no rows need to be removed after creating k distinct rows.

Detail of the UN Calculation

Figure 3:
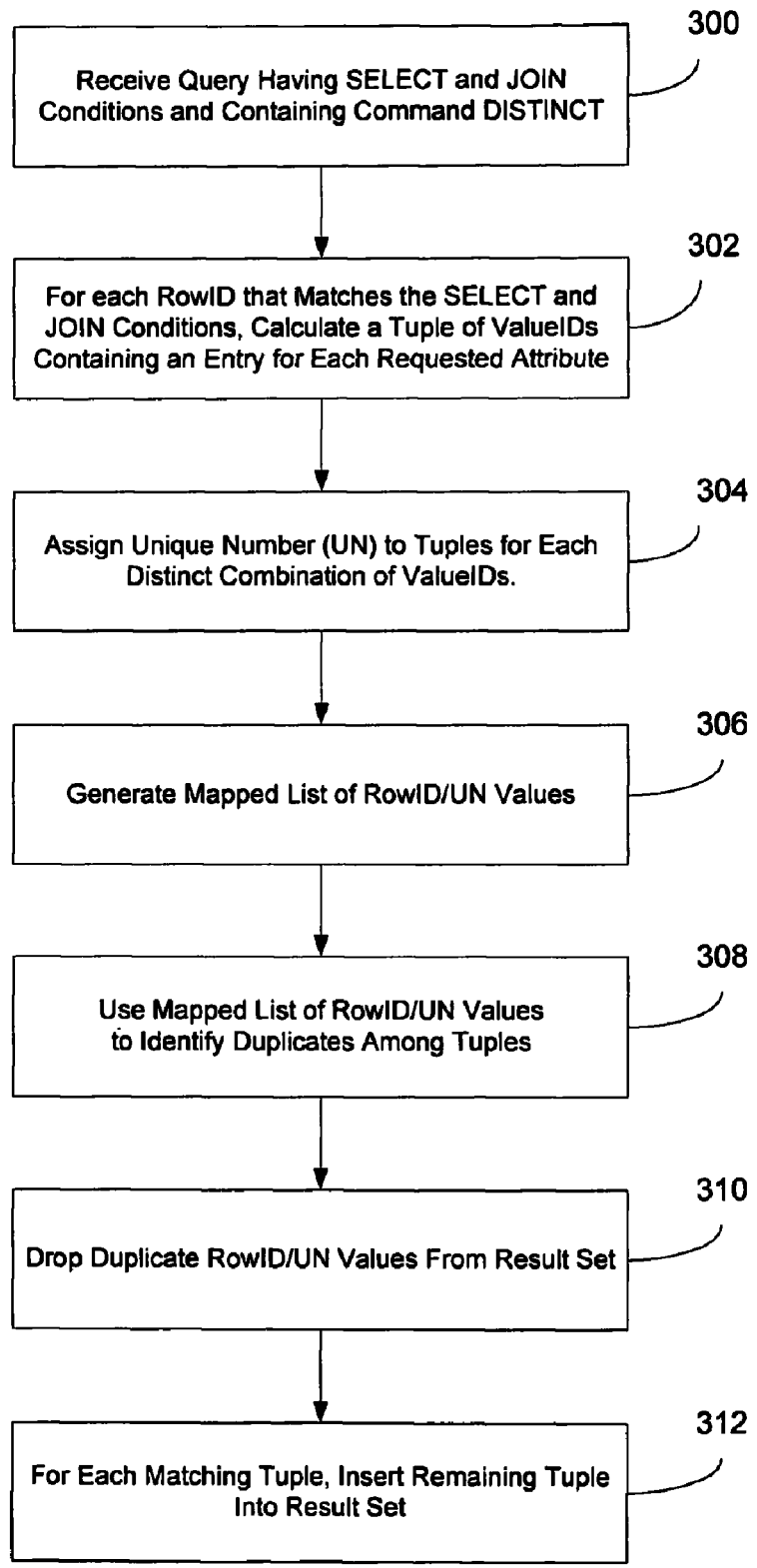
FIG. 3 is a flowchart of a method for efficient calculation of sets of distinct results.

FIG. 3 illustrates a method for efficient calculation of sets of distinct results in an information retrieval service system. At 300, a query is received by the information retrieval service system and converted into a form suitable for processing. The converted query has SELECT and JOIN conditions and contains the command DISTINCT. In a system such as the TREX system described above, the result set for the query is calculated by an appropriate search engine, such as the attribute engine. At 302, for each RowID that matches the SELECT and JOIN conditions, a tuple of ValueIDs containing an entry for each requested attribute is calculated. In the query example previously described, these tuples for the table CUSTOMERS might look like the following:

| RowID | ValueID_FirstName | ValueID_LastName |
|---|---|---|
| 1 | 5 | 7 |
| 2 | 3 | 17 |
| 3 | 4 | 8 |
| 4 | 5 | 7 |
| 5 | 5 | 13 |

In a second processing pass, at 304 these tuples are assigned a unique number (UN) for each distinct combination of ValueIDs. This is preferably done by using a hashing algorithm. The outcome of this step is a mapped list of RowID/UN values, at 306. In the query example, the UN is equal for rows 1 and 4, since they have exactly the same combination of ValueIDs for the requested attributes.

| RowID | UN |
|---|---|
| 1 | 1 |
| 2 | 2 |
| 3 | 3 |
| 4 | 1 |
| 5 | 4 |

For the BOOKS table, a similar mapping of RowID/UN values is calculated, using the ValueIDs of the requested attribute Books.Author. In a next projection step, at 308 this mapping between RowIDs and UNs for the tables BOOKS and CUSTOMERS is used to identify duplicates, as shown below.

| RowID_Customers | RowID_Books | UN_Customers | UN_Books |
|---|---|---|---|
| 1 | 1 | 1 | 4 |
| 2 | 2 | 2 | 7 |
| 3 | 3 | 3 | 3 |
| 4 | 4 | 1 | 4 |
| 5 | 5 | 4 | 6 |

An efficient hashing algorithm that iterates over the RowID tuples of the result set during projection can be used to identify tuples with the same set of UN_ values (such as the bold rows 1 and 4 above). Those tuples have the same combination of requested attributes values (customer first and last names and book author), and thus are duplicates. Duplicates are dropped from the result at 310. Accordingly, only one member of each such set of tuples is inserted into the result set at 312.

The above methods and systems avoid projection of intermediate result lines that are later discarded, increasing concurrency by enabling UN mappings to be calculated for each table separately and hence for many tables in parallel which exploits the recent trend of increasing parallel computation capacities of modern hardware. RowID/UN lists can be calculated once, and cached or persisted between several queries.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method for efficient calculation of sets of distinct results in an information retrieval service, the method comprising:
receiving a query from a client application, the query having at least two requested attributes and one or more conditions;
for each row identifier in each of a plurality of database tables that matches the one or more conditions, calculating a tuple of value identifiers having an entry for each requested attribute;
separately, substantially, and concurrently assigning for each of the plurality of database tables a unique number to the tuple for each distinct combination of the value identifiers corresponding to the requested attributes;
determining, from a list of the row identifiers mapped with the unique numbers, duplicate list entries based on the attributes requested in the query by:
mapping, for matching row identifiers from two or more database tables, the corresponding unique numbers from each distinct combination of the value identifiers, and
identifying, using a hashing algorithm, duplicate tuples with a same set of unique numbers;
deleting, prior to projection, duplicate list entries from the list of the row identifiers mapped with the unique numbers to isolate for each unique number a single remaining tuple; and
inserting the single remaining tuple into a result set.

2. The method in accordance with claim 1, further comprising returning the result set to the client application.

3. The method in accordance with claim 1, wherein the one or more conditions include a SELECT condition and a JOIN condition.

4. A non-transitory machine-readable storage medium containing a set of instructions for an information retrieval computer, the set of instructions causing the information retrieval computer to:
receive a query from a client application, the query having at least one requested attribute and one or more conditions;
for each row identifier in each of a plurality of database tables that match the one or more conditions, calculate a tuple of value identifiers having an entry for each requested attribute;
separately, substantially, and concurrently assign for each of the plurality of database tables a unique number to the tuple for each distinct combination of the value identifiers corresponding to the requested attributes;
determine, from a list of the row identifiers mapped with the unique numbers, duplicate list entries based on the attributes requested in the query by:
mapping, for matching row identifiers from two or more database tables, the corresponding unique numbers from each distinct combination of the value identifiers, and
identifying, using a hashing algorithm, duplicate tuples with a same set of unique numbers;
deleting, prior to projection, duplicate list entries from the list of the row identifiers mapped with the unique numbers to isolate for each unique number a single remaining tuple; and
insert, during a projection step, the single remaining tuple into a result set.

5. The non-transitory machine-readable storage medium in accordance with claim 4, wherein the set of instructions further causes the information retrieval computer to process SELECT and JOIN conditions.

6. A system for efficient calculation of sets of distinct results in an information retrieval service, the system comprising:
a processor;
a memory for storing the instructions, which when executed by the processor, cause to implement:
a name server module for receiving a query from a client application, the query having at least one requested attribute and one or more conditions; and
an index server module having an attribute engine, the attribute engine parsing the query to execute the one or more conditions to search the at least one requested attribute, the attribute engine further being configured to:
for each row identifier in each of a plurality of database tables that matches the one or more conditions, calculate a tuple of value identifiers having an entry for each requested attribute;
assign, in parallel, a unique number to the tuple for each distinct combination of the value identifiers in each of the plurality of database tables; and
determine, from the list of the row identifiers mapped with the unique numbers, duplicate list entries based on the attributes specified in the query by:
mapping, for matching row identifiers from two or more database tables, the corresponding unique numbers from each distinct combination of the value identifiers, and
identifying, using a hashing algorithm, duplicate tuples with a same set of unique numbers;
deleting, prior to projection, duplicate list entries from the list of the row identifiers mapped with the unique numbers to isolate for each unique number a single remaining tuple; and
insert, during a projection step, the single remaining tuple into a result set.

7. The system in accordance with claim 6, further comprising a queue server module for storing the result set and providing access to the result set to the client application.

8. The system in accordance with claim 6, wherein the index server module is further configured to process SELECT and JOIN conditions.

9. The method in accordance with claim 1, further comprising storing the result set.

10. The non-transitory machine-readable storage medium in accordance with claim 4, wherein the set of instructions further causes the information retrieval computer to return the result set to the client application.

11. The non-transitory machine-readable storage medium in accordance with claim 4, wherein the set of instructions further causes the information retrieval computer to store the result set.

* * * * *